United States Patent [19]

Bergmann

[11] Patent Number: 4,682,626
[45] Date of Patent: Jul. 28, 1987

[54] SINGLE-LEVER WATER MIXER FITTING

[75] Inventor: Konrad Bergmann, Wittlich, Fed. Rep. of Germany

[73] Assignee: American Standard Inc., New York, N.Y.

[21] Appl. No.: 835,916

[22] Filed: Mar. 4, 1986

[30] Foreign Application Priority Data

Mar. 4, 1985 [DE] Fed. Rep. of Germany ....... 3507559
Mar. 12, 1985 [DE] Fed. Rep. of Germany ....... 3508680
Apr. 16, 1985 [DE] Fed. Rep. of Germany ....... 3513549

[51] Int. Cl.$^4$ .................. F16K 37/00; H01H 35/00
[52] U.S. Cl. .................. 137/551; 137/625.4; 307/66; 307/117; 320/2; 323/906
[58] Field of Search ............... 137/551, 625.17, 625.4; 116/216; 307/66, 117; 323/906; 320/2; 236/94

[56] References Cited

U.S. PATENT DOCUMENTS

| 3,178,150 | 4/1965 | Johnson | 137/551 |
| 3,960,016 | 6/1976 | Symmons | 236/94 X |
| 4,017,725 | 4/1977 | Roen | 320/2 X |
| 4,122,396 | 10/1978 | Grazier et al. | 320/2 X |
| 4,406,398 | 9/1983 | Perkins | 137/551 X |
| 4,509,550 | 4/1985 | Monk | 137/551 |
| 4,575,262 | 3/1986 | Anderson | 137/551 |

Primary Examiner—Alan Cohan
Assistant Examiner—John A. Rivell
Attorney, Agent, or Firm—James J. Salerno, Jr.; Robert G. Crooks; John P. Sinnott

[57] ABSTRACT

The disclosure and drawings describe and illustrate a water mixer fitting having a temperature measuring means operatively coupled between the mixed water outlet opening and a display terminal disposed in or adjacent to the handle assembly.

15 Claims, 14 Drawing Figures

SINGLE-LEVER WATER MIXER FITTING

BACKGROUND OF THE INVENTION

1. Field of the Invention

The invention relates to a water mixing faucet or fitting, in particular, a single control fitting of a temperature sensing means, operably coupled to the water outlet to display the temperature of the water being discharged.

2. Description of the Prior Art

Single control fittings are known, such as is used for wash basins, bathtubs, showers and bidets. They are designed to mix water flowing from the hot and/or cold water inlets, which are coupled to a mixing chamber so that the water being discharged is at the desired temperature. In order to ascertain the temperature of the mixed water and to avoid scalding, single control fittings of this type also include a temperature indicater operably coupled to a temperature measuring circuit.

In the past, fittings of this type having separate valve assemblies for hot and cold water and which are coupled to a discharge outlet to control wate r temperature, are known. Also, the single control fittings of the present type have become the fitting of choice. In a single control fitting, the temperature of the water being discharged is determined by shifting a lever which positions a valving element partially over the water inlet and outlet openings. The mixing fittings heretofore employed are shown in German patent DE-OS No. 30 45 531, FIGS. 1 to 4 and 7 through 8, respectively.

The temperature sensor shown, is a resistance sensor which projects into the free space of the mixed water outlet. The temperature sensor is connected, via connecting leads to the temperature measuring circuit, which is located at the rear of the water mixer fitting. The temperature measuring circuit includes a bridge circuit by which the desired temperature of the mixed water can be set. The element which visually displays the water temperature lights up whenever the temperature of the mixed water either increases or decreases from the desired setting.

In the known previously described water mixer fitting, the temperature measuring circuit has as its power source, a battery or an accumulator. The terms battery and accumulator, as used in this application, refer to a battery as a primary element that cannot be recharged and an accumulator as a secondary element that can be recharged. The temperature measuring circuit is switched on only when the water mixer fitting is in operation in order to keep power usage as low as possible. The measuring circuit is energized by means of a flow sensor which is positioned in the outlet of the water mixer fitting, cf FIG. 1 in DE-OS No. 30 45 531. The temperature indicator is activated through the temperature measuring circuit only when the rate of flow through the water outlet is sufficient.

In another water mixer fitting of the type described above, an electromechanical switch for each actuating element is used to switch the temperature measuring circuit on and off, cf U.S. Pat. No. 4,406,398, so that it is energized only when an actuating element is turned to its open position. Even with the power saving features provided by the design of the mixer fitting, frequent changing of the battery or frequent recharging of the accumulator is required. The overall construction requires relatively extensive changes to the water mixer fitting, particularly to water outlet design. The temperature indicator of this water mixer fitting is not particularly suitable for normal applications and, therefore, the above described water mixer fitting is not suitable for widespread use.

SUMMARY OF THE INVENTION

The object of the invention is to provide an electronic temperature measuring circuit for a water mixer fitting, particularly the single-lever type, and which includes electronics, switching, construction, design and application, and which is economical to manufacture. The water mixer fitting according to the invention, which meets the objectives described above, includes a temperature indicator and temperature measuring circuit having either a battery or an accumulator as a first power source, and an additional power source of at least one solar cell which is operable to energize the temperature measuring circuit only above a given predetermined light intensity. Preferably, means are provided so that below a given light intensity, only the battery or the accumulator is effective as power source for the temperature measuring circuit. Also, below a still lower given light intensity, both the solar cell and the battery or accumulator become inoperative and will not function as the power source for the temperature measuring circuit.

An object of the present invention is to provide, in addition to the battery or accumulator, at least one solar cell as the power source for the temperature measuring circuit. The at least one solar cell is operable above a given predetermined light intensity. If the light intensity is below the given predetermined light intensity, then the battery or accumulator is operable as the power source for the temperature measuring circuit. When the light intensity is below the given lower limit, neither the battery nor the accumulator and the at least one solar cell are operable. Such an arrangement provides only minimal power consumption for the temperature measuring circuit. When the light intensity is sufficiently high, only the at least one solar cell is operable, thus avoiding usage of either the battery or accumulator as the power source and, conversely, when the light intensity is sufficiently low, then neither the at least one solar cell nor the battery or accumulator are operable as the power source for the temperature measuring circuit.

Another object of the invention is directed to a water mixer fitting in general and is described herein only with reference to embodiments of a single-lever mixer fitting. For illustrative purposes, many variations of the invention can be made for use with fittings having two actuating elements. The invention can be further applied to temperature measuring circuits used for room temperature displays, clocks, body thermometers, thermos flasks, baby bottles, or the like. Also, the power supply used for the temperature measuring circuit in the present invention can be used without difficulty for other measuring circuits, such as measuring circuits for barometers and hygrometers.

BRIEF DESCRIPTION OF THE DRAWINGS

The invention will be more readily understood by reference to the following detailed description taken in conjunction with the accompanying drawings wherein.

DESCRIPTION OF THE PREFERRED EMBODIMENTS

Figure 1A:
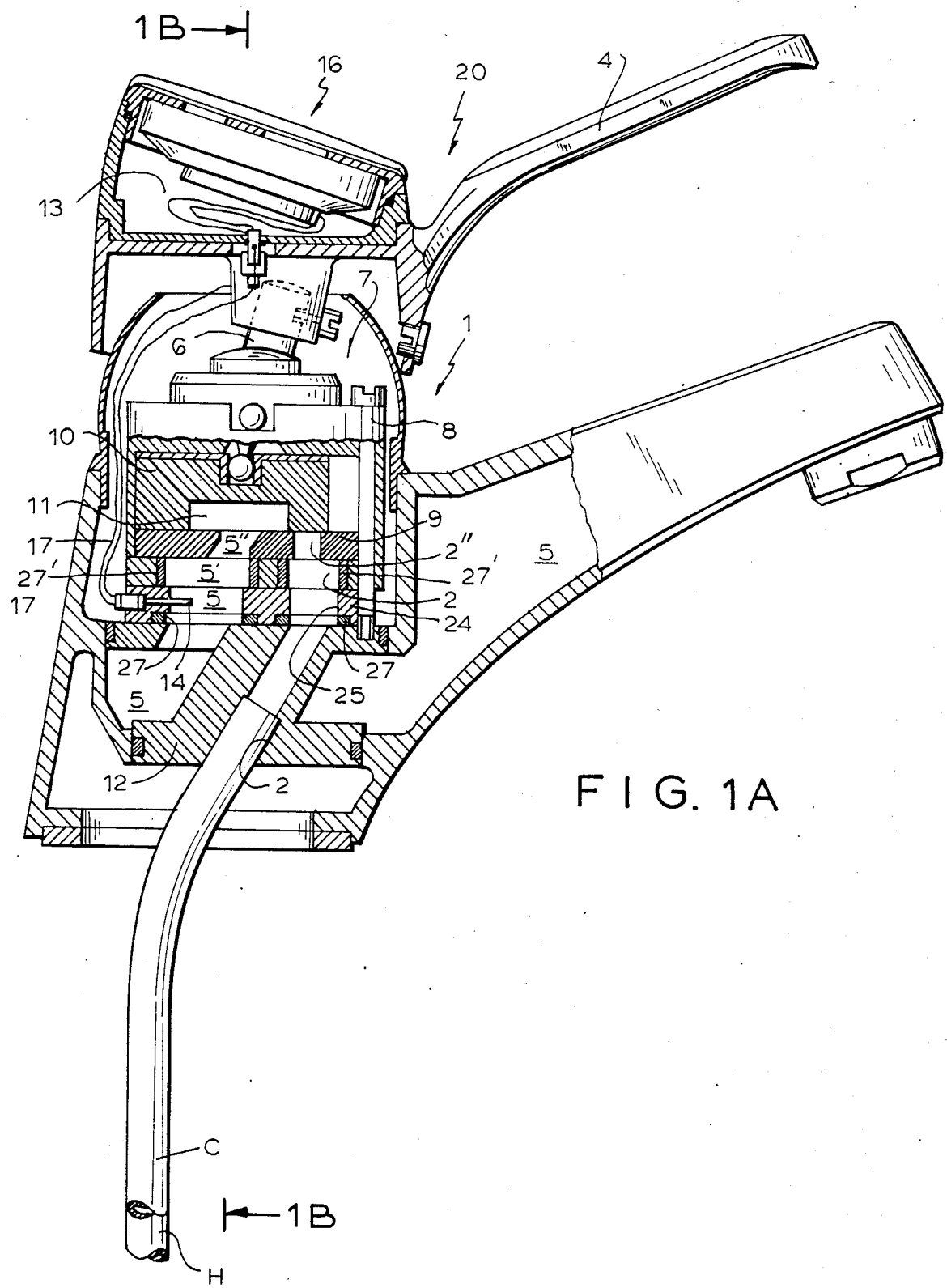
FIG. 1A is an elevational view, partly in section, illustrating the fully assembled invention herein.
Figure 1B:
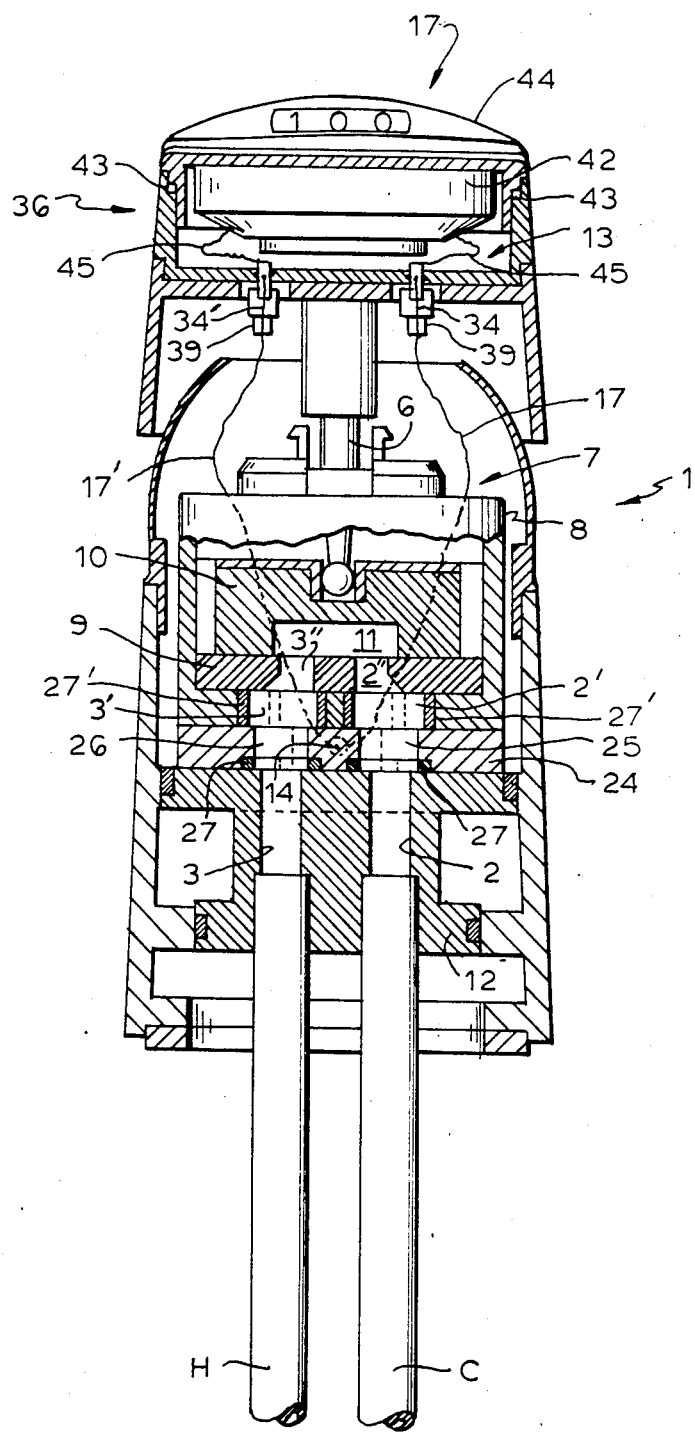
FIG. 1B is an elevational view, in section, taken along the lines 1B—1B of FIG. 1A.
Figure 2:
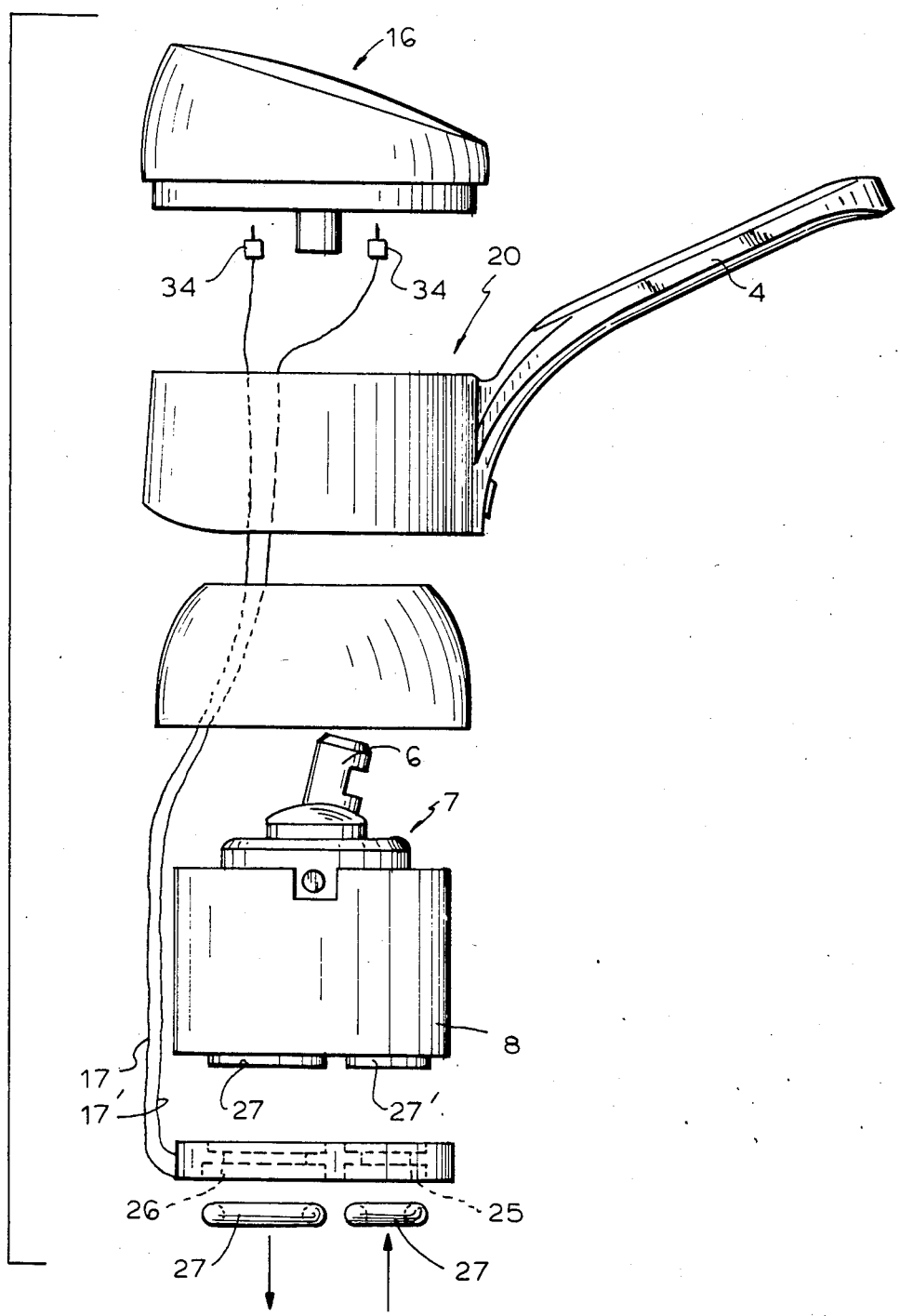
FIG. 2 is an exploded view, in elevation, of the elements forming the mixing valve shown in FIG. 1A.
Figure 3:
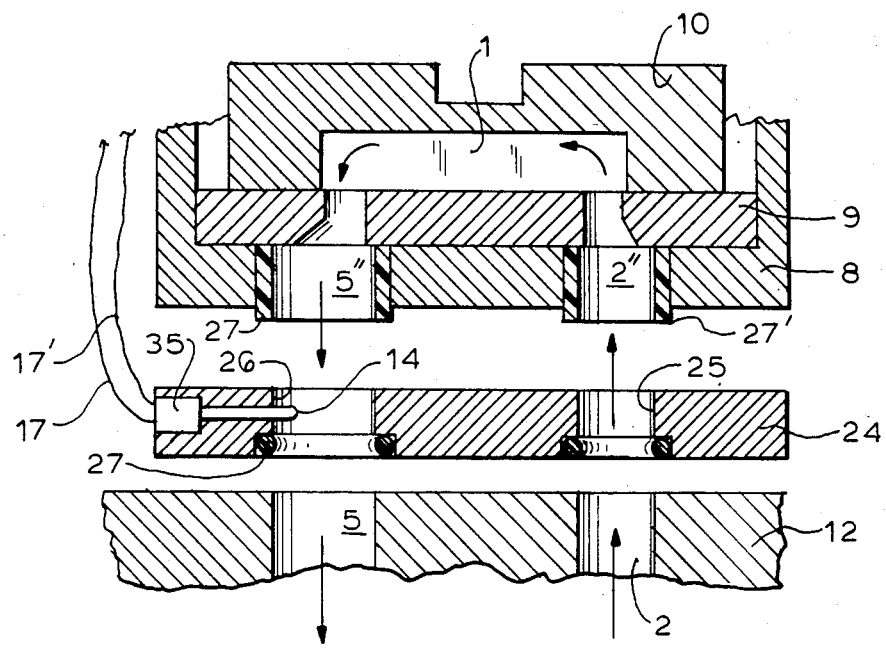
FIG. 3 is an enlarged fragmentary sectional view, in elevation, illustrating the flow path of water through the valving elements of the mixing valve shown in FIG. 1A.

For a better understanding of the invention, reference is had, particularly to FIGS. 1A and 1B, which illustrate one form of a single-lever mixer fitting 1 having a temperature indicator means 16 electrically coupled to its valve assembly 7. FIG. 2 illustrates, in exploded view, the several elements forming the valve assembly 7 and temperature indicator means 16. The single-lever mixer fitting 1 includes body or housing 12 having cold and hot water passages 2,3 to which are coupled cold and hot water conduits C,H respectively. Sensor plate 24 is formed having a water outlet opening 5, cold and hot water inlet openings 25,26, and is mounted thereon in a watertight seal by O-rings 27, as shown in FIG. 3. The several valving components are housed in a replaceable cartridge 8 having complimentary water outlet opening 5', cold and hot water inlet openings 2',3', and is mounted on sensor plate 24 in a watertight seal by O-rings 27'. A stationary disc 9, having a water outlet opening 5'', cold and hot water inlet openings 2'',3'', is mounted in a watertight seal to replaceable cartridge 8 by O-rings 27' to provide water passageways to couple with cold and hot water passages 2,3 and water outlet opening 5 of housing 12. A shiftable disc 10, having a mixing chamber 11, is mounted in watertight sealing engagement with stationary disc 9 so that when shifted from a closed to an open position, cold and/or hot water enters mixing chamber 11 and flows through water outlet opening 5 where the temperature sensor end 14 is operative and displays the water temperature on the temperature indicator means 16. It is preferred that discs 9,10, or their mating surfaces, be formed of a high content aluminum oxide. An actuating lever 6 is operably coupled to shiftable disc 10 to which handle assembly 20 is removably mounted. Temperature measuring circuit 13 is mounted to sensor plate 24 with temperature sensor end 14 extending through water outlet opening 5. Temperature sensor end 14 is electrically coupled to temperature indicator means 16 through wire leads 17,17'.

FIG. 3 is an enlarged fragmentary sectional view, in elevation, showing portions of the valving components, sensor plate and housing of single-lever water mixer fitting 1. Mixing chamber 11 of shiftable disc 10 and stationary disc 9 are shown mounted in watertight engagement to replaceable cartridge 8. As seen in FIG. 3, the water flow path is depicted by the arrows showing hot and/or cold water passing through mixing chamber 11 and exiting through outlet openings 5,5',5'' of fitting 1. Also, the temperature sensor end 14 of temperature measuring circuit 13 extends into outlet opening 5 so that the temperature of the water flowing through is measured and displayed on temperature indicator means 16.

Figure 4:
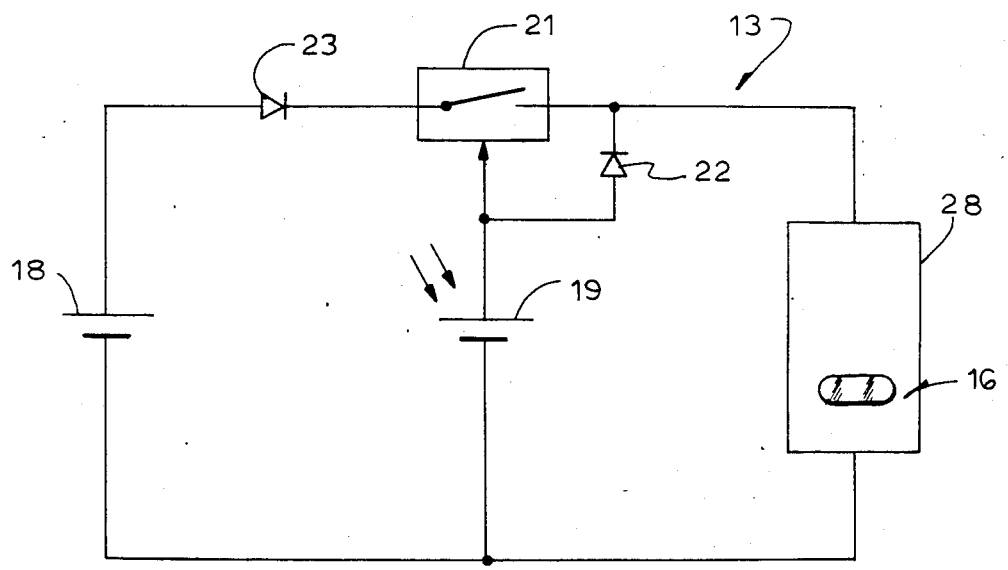
FIG. 4 is a schematic diagram of the circuit for operating the temperature display screen.

With reference to FIG. 4, the electronic and switching means for temperature circuit 13 is shown. FIG. 4 illustrates, in block diagram, electronic temperature measuring circuit 13, and in FIG. 3, a temperature sensor end 14 is arranged in the mixed water outlet 5. Temperature sensor end 14 is shown in FIG. 3, whereas in the block diagram according to FIG. 4, it is shown as part of a temperature measuring block 28. A temperature indicator 16 is also part of the temperature measuring block 28. Temperature measuring circuit 13 includes a battery 18 as power source and, in addition, in accordance with the invention, temperature measuring circuit 13 includes a solar cell 19 as a further or second power source. By switching means, as explained below, only the solar cell 19 is effective as the power source for the temperature measuring circuit 13 at a given predetermined light intensity. When the light intensity is below the given predetermined limit, only the battery 18 is effective as the power source for temperature measuring circuit 13. When the light intensity is below a given lower limit, neither solar cell 19 nor battery 18 is effective or operable as the power source for temperature measuring circuit 13. Also shown in FIG. 4, the switching means of temperature measuring circuit 13 includes auxiliary switch 21 and two switching diodes 22,23.

If the light intensity to which fitting 1 is exposed is above a given upper predetermined limit, then only the solar cell 19 is effective as power source for temperature measuring circuit 13, although auxiliary switch 21 is closed. This is achieved because the voltage of solar cell 19 is greater than the voltage of battery 18, so that although current can flow from solar cell 19 via switching diode 22 and temperature measuring block 28, switching diode 23 prevents current flow to battery 18. Switching diode 22 also prevents current flow from battery 18 via solar cell 19. The above description of temperature measuring circuit 13 is operable only if the switching diodes 22,23 are ideal switches which, however, they are not. What actually happens, therefore, when the light intensity falls below the medium intensity limit is that the power supply from the solar cell to the temperature measuring circuit 13 is not abruptly interrupted and exclusively affected by battery 18, but that there is a transition region, that is, the region between the predetermined upper limit and the given lower limit in which solar cell 19 is also effective as power source for temperature measuring circuit 13. The reverse also applies, i.e. when the intensity increases from its lower inoperable limit to when it exceeds the upper intensity limit.

If fitting 1 is exposed to a light intensity that is below the given lower limit, e.g. if the intensity of illumination is lower than 5 lux, then neither solar cell 19 nor battery 28 are effective or operable as power source for temperature measuring circuit 13. However, if the voltage of solar cell 19 is not sufficiently high and auxiliary switch 21 controlled by solar cell 19 is open as shown in FIG. 4, then no current can flow from battery 18.

The explanations above concerning the switching aspects of temperature measuring circuit 13 of fitting 1 apply whether the temperature measuring circuit 13 is switched off when not in use. In the state of the art on which the invention is based, a temperature sensor end 14 is disposed in mixed water outlet 5 for this purpose.

A further object of the invention is to provide an electromechanical switch to turn the temperature measuring circuit on and off. By use of the handle assembly 20, through its turn and tilt lever 4, it will vary shiftable disc 10 relative to water inlet openings 2,3 and outlet opening 5 which, in turn, will actuate the temperature measuring circuit 13 from its off position to its on position. Thus, by simply controlling the temperature measuring circuit 13 by use of handle assembly 20, electrical energy is used only when water is flowing through mixed water outlet 5 of fitting 1.

Temperature measuring circuit 13 of water mixer fitting 1, shown in FIG. 4, provides battery 18 as the first power source. The first power source may be modified or replaced by an accumulator. Then, by simply modifying temperature circuit 13 in such a way known to the art, the accumulator can be recharged by solar cell 19.

In general, temperature indicator means 16, used in the water mixer fitting 1 to display water temperature, may be lamps known in the art; however, it is preferred to use a liquid crystal digital display or a light emitting diode digital display for the temperature indicator 16. A liquid crystal digital display has a lower power consumption but requires additional lighting in order to be seen in the dark. A light emitting diode digital display has a slightly higher power consumption but can be read in the dark. The particular application will decide which of the two types of display means is used.

According to a further object of the invention, a water mixer fitting can be designed for a bathtub or similar fixture such that a water level sensor is connected to the temperature measuring circuit which scans its water level to set a target water level and when the target water level is reached, an audible warning signal, a switching signal or similar can be given off by the temperature measuring circuit.

Figure 9:
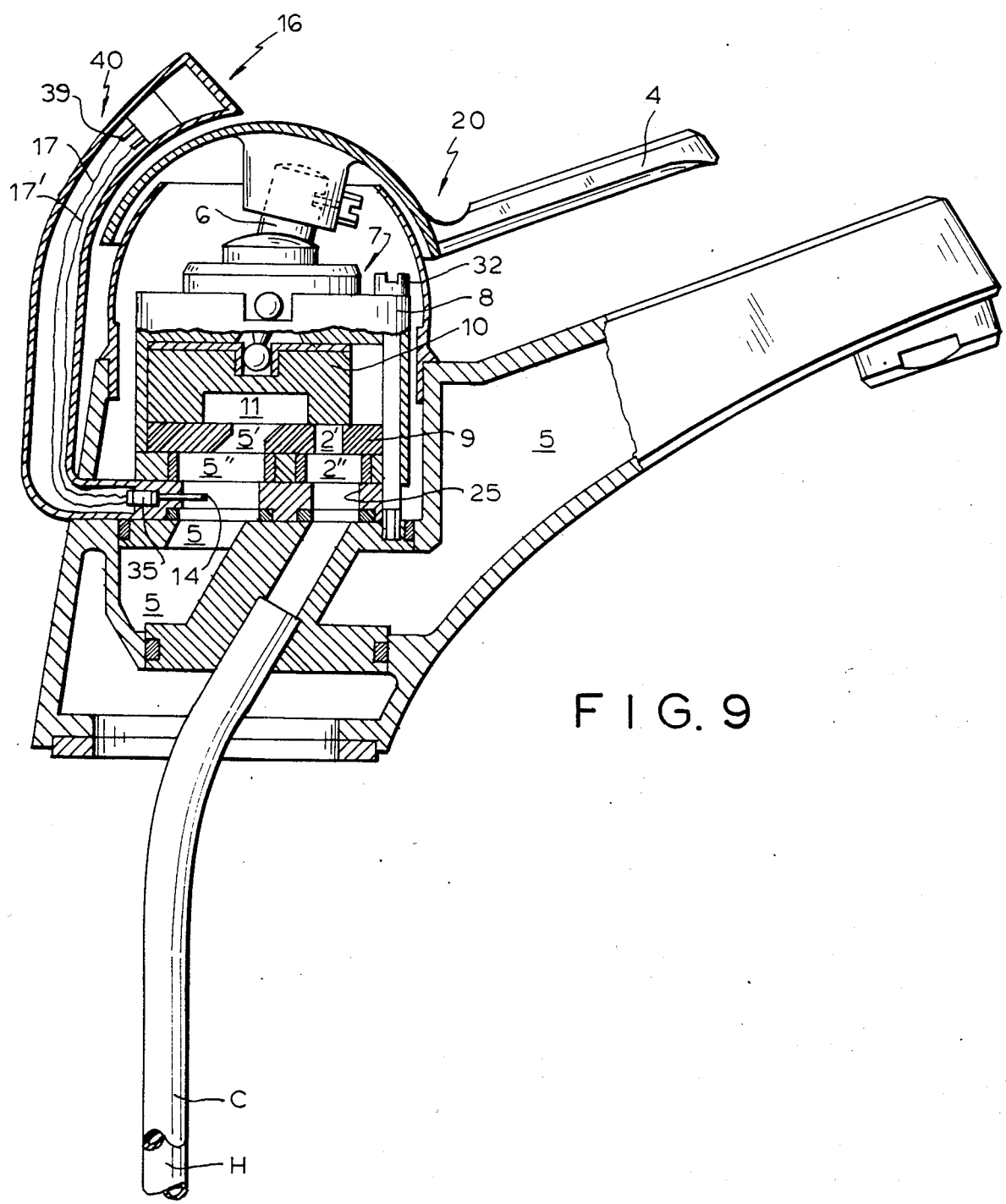
FIG. 9 is a view similar to FIG. 1A, illustrating another form of the invention.

Water mixer fitting 1 of the type illustrated in FIGS. 1,9 includes a temperature sensor 14 that is mounted in a ring surrounding mixed water outlet 5 and is positioned, preferably, next to mixing chamber 11. Sensor plate 24 has openings 25,26 which are aligned with water inlets 2,3 and mixed water outlet 5. The single-lever mixer fitting 1, sensor plate 24, is positioned between replaceable cartridge 8 and body 12 so that few design changes need be made to any standard type water mixer fitting. Sensor plate 24 is formed to match the dimensions of the particular water mixer fitting. For a standard type single-lever mixer fitting, sensor plate 24 is formed having a thickness of 4 to 7 mm, preferably a thickness of approximately 5.5 mm and a diameter of approximately 48 mm.

Figure 5:
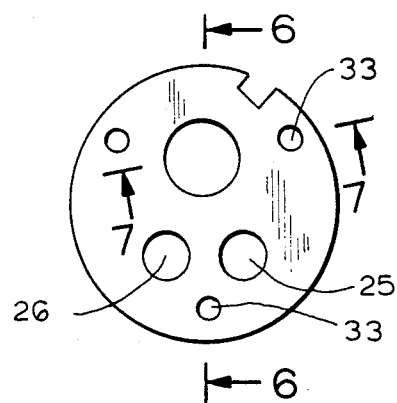
FIG. 5 is a plan view of the temperature sensor plate for the mixing valve shown in FIG. 1A.
Figure 6:
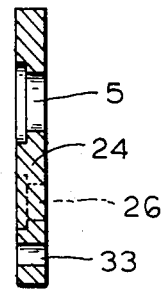
FIG. 6 is a sectional view, taken along the lines 6—6 of FIG. 5.
Figure 7:
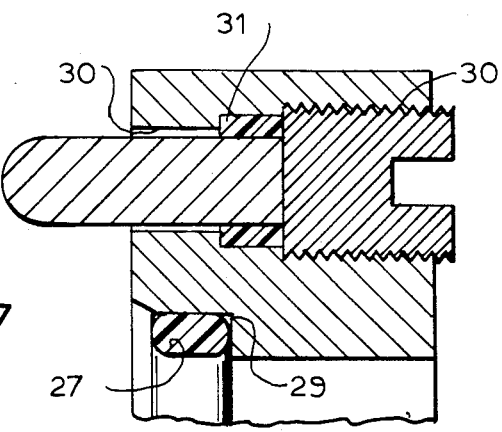
FIG. 7 is a sectional view, taken along the lines 7—7 of FIG. 5.

As explained above, cartridge valve 8 and sensor plate 24 are sealed, respectively, by O-rings 27,27' so that the assembly is in a watertight seal and prevents leaks as water flows from the inlets 2,3 to the outlet 5. To facilitate seating of O-ring 27, a groove 29 is formed around inlets 25,26 and outlet 5 of sensor plate 21 with O-rings 27 nesting therein, see FIG. 7. FIGS. 5 to 7 illustrate temperature sensor end 14 mounted in temperature sensor plate 24. Temperature sensor end 14 extends through radial opening 30 and into water outlet opening 5 of mixer fitting 1, and is mounted in position by threaded retainer 35 into complimentary threaded portion of opening 30. Temperature sensor end 14 is held in a watertight seal by O-ring 31 interposed between threaded retainer 35 and opening 30, as shown in FIG. 7. Threaded retainer 34 is provided with a transverse slot 37 so that temperature sensor end 14 can be removably mounted simply by using a screwdriver.

FIG. 9 illustrates another embodiment of a temperature sensing means 15' for water mixer fitting 1. Tubular attachment 40 is mounted to sensor plate 24 and houses wire leads 17,17' of attachment 35 above and to the rear of handle assembly 20, and carries in its open end temperature indicator 16. Alternative means for mounting tubular attachment 40 may be used, such as a threaded socket.

FIG. 1 illustrates water mixer fitting 1 as a single-lever mixer fitting in which handle assembly 20 having a covering cap 36 is mounted thereto. Covering cap 36 is shaped in the form of a disc and is fitted with the temperature indicator 16. Temperature indicator 16 is connected or connectable via wire leads 17,17' with the sensor plate 24. Ends 34,34' of wire leads 17,17' are electrically connected to covering cap 36 in a bayonet clip as shown in FIG. 1B.

Figure 8:
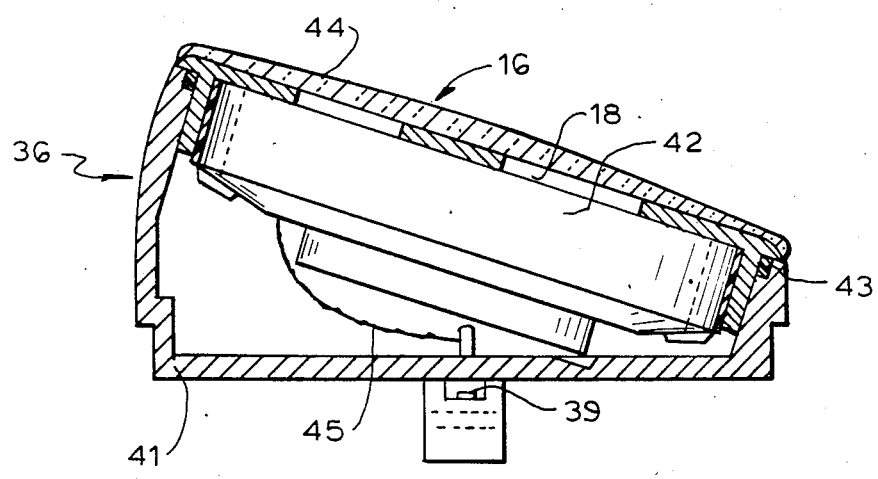
FIG. 8 is an enlarged fragmentary sectional view, in elevation, of the cap shown in FIG. 2.

FIG. 8 illustrates an enlarged sectional view of cap 36, connecting means 39. Connecting means 39 is in the form of jacks which permit easy connection and removal of wire leads 17,17' through ends 34,34' of wires 17,17'. The connections are protected against moisture and water spray so that short circuits do not occur between connecting means 39 and wire leads 34,34'.

Figure 10:
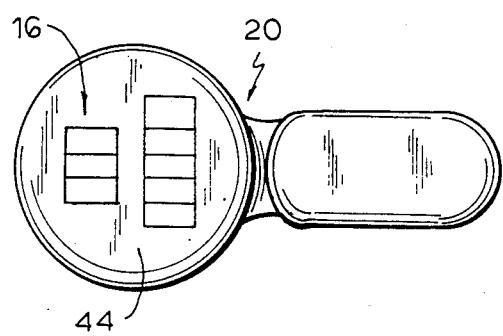
FIG. 10 is a top plan view of the handle and cap assembly for a deck mounted fitting such as a lavatory.

Also shown in FIG. 1 and whose fixture is shown magnified in FIG. 10, the temperature measuring circuit 13 is arranged and constructed in cap 36. Arranged on the top of cap 36, in addition to the temperature indicator 16, is solar cell 19 which, as shown, is in a solar cell group. Battery 18 is also indicated in a customary recess.

Figure 11:
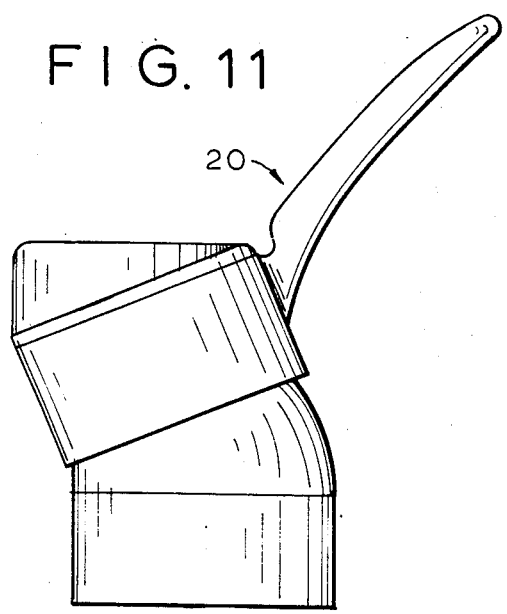
FIG. 11 is a side elevational view of FIG. 10, shown in its open position.
Figure 12:
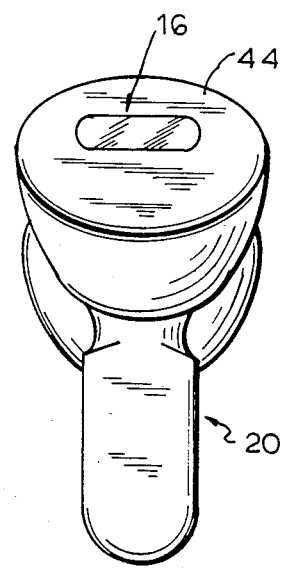
FIG. 12 is a front plan view of the handle and cap assembly for a wall mounted fitting such as a shower.
Figure 13:
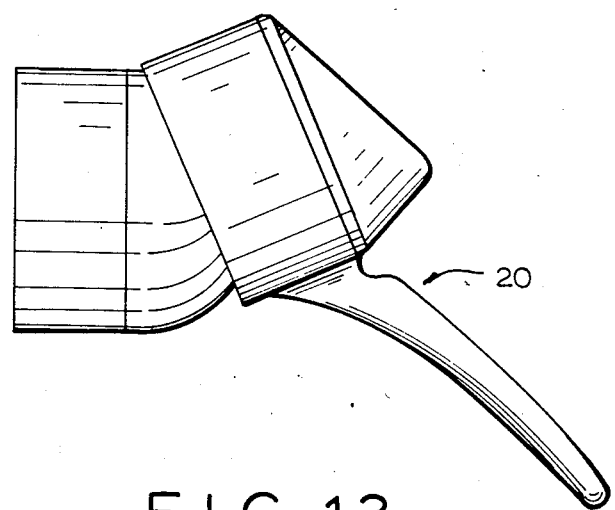
FIG. 13 is a side elevational view of the handle and cap assembly illustrated in FIG. 12, shown in its open position.

FIGS. 10–13 illustrate a wedge-shaped handle assembly 21 which facilitates good visibility of the temperature indicator means 16. FIGS. 10 and 11 illustrate water mixer fitting 1 having a handle assembly 20 for a wash basin. In the design shown in FIGS. 10 and 11, the inclination chosen is forwards toware the actuating end of the actuating lever 4. The realization of the inclination by means of the wedge-like shape of cap 36 offers the advantage that this inclination can be changed by adjusting cap 36. FIGS. 12 and 13 illustrate a bath or shower water mixer fitting in which the cap 36 is mounted on the wall. The line of sight of temperature indicator means 16, when in use, is as indicated in FIGS. 12 and 13.

FIGS. 1 through 8, 10 and 11 illustrate a preferred cap 36 design having the angle of inclination of the top of cap 36 with the actuating element 11 in the closed position that is about 80° to 50°, preferably approximately 70°, relative to the main axis of the water mixer fitting 1.

FIG. 8 illustrates cap 36 having an annular recess 41 open at the top and preferably capable of being coupled to handle 4. An electronic module 42 is insertable in recess 41 as by a snap fit. Electronic module 42 is sealed against the recess 41 by means of a seal ring 43 and covered by a transparent plastic cap 44. Connecting leads 45 run between connecting means 39 and electronic module 42.

FIG. 1 illustrates wire leads 17,17' which extend between sensor plate 24 and cap 36 of mixer fitting 1. This design requires few changes to the known single-lever mixer fitting. All that is required is to insert sensor plate 24 between cartridge 8 and body 12, run wire leads 17,17' through to handle assembly 20, replace the covering cap with cap 36, and connect wire leads 17,17' to connecting means 39 of cap 36 to complete the conversion of a single-lever mixer fitting without a temperature circuit into one with a temperature measuring circuit.

It is claimed:

1. A water mixer fitting, of the single-handle type, having hot and cold water inlets in fluid communication with a water discharge passage, said discharge pasaage including a mixing chamber in which mixed not and cold water is discharged through a water outlet opening in sdid discharge passage, said mixer fitting comprising:
    valve means, operably coupled to said handle, for controlling water volume and for proportioning hot and cold water through said discharge passage;
    a temperature sensor, operably coupled to said water discharge passage, and being in fluid communication therewith;
    an indicator means mounted on said fitting and including a numeric temperature display electrically connected to a temperature measuring circuit and said temperature sensor;
    said temperature measuring circuit including a battery as a first power source and at least one solar cell as a second power source, and having switching means for selectively operating said first and second power sources, said second power source being operable only above a given predetermined light intensity.

2. The fitting, in accordance with claim 1, wherein said temperature display is a liquid crystal digital display.

3. The fitting, in accordance with claim 1, wherein said temperature display is a light-emitting diode digital display.

4. The fitting, in accordance with claim 1, wherein said temperature measuring circuit includes a first switching diode electrically connected to said first power source, a second switching diode electrically connected to said second power source, and an auxiliary switch operably connected between said first and second power sources and being energized by second power source, said temperature measuring circuit operable when said second power source is exposed to a light intensity greater than 5 lux.

5. The fitting, in accordance with claim 4, wherein said auxiliary switch is inoperative when said seoond power source is exposed to a light intensity of less than 5 lux.

6. The fitting, in accordance with claim 4, wherein said first power source is operative when said second power source is exposed to a light intensity below said given predetermined light intensity and above 5 lux.

7. The fitting, in accordance with claim 1, wherein said sensor is mounted through a radial opening of a member in the form of a ring, which is mounted in sealing relation to said valving means, said sensor being positioned adjacent to said mixing chamber of said discharge passage.

8. The fitting, in accordance with claim 7, wherein said ring is the form of a sensor plate and includes hot and cold water inlet openings and a water discharge opening, said sensor extending into said water discharge opening so that hot and/or cold water passing through discharge passage is in fluid communication with said sensor.

9. The fitting, in accordance with claim 8, includes recesses formed around the perimeters of said hot and cold water inlet openings and said water discharge opening on opposite faces of said sensor plate, and a resilient member mounted in each of said recesses to provide a watertight seal.

10. The fitting, in accordance with claim 9, wherein said sensor plate is formed with a radially extended passage in which said temperature sensor is mounted, said sensor extending into said discharge passage.

11. The fitting, in accordance with claim 10, wherein said radial passage is threaded and said sensor is provided with corresponding external threads.

12. The fitting, in accordance with claim 1, includes an externally mounted vertically extending tubular member, one end of which is coupled to the fitting, the other end of which extends adjacent said handle, said tubular member having a passage in communication with said sensor, said temperature display mounted to said other end of said tubular member, and said temperature measuring circuit mounted in said passage and electrically connected to said sensor and said temperature display.

13. The fitting, in accordance with claim 1, wherein said handle is in the form of a lever-type handle. having a body mounted on the fitting with an actuating lever extending therefrom, said body having a horizontal top surface including an upstanding rim formed therearound defining a socket, a cap assembly mounted in said socket, said cap assembly having an inclined top surface extending downward toward said lever, said numeric indicator means mounted to said top inclined surface, said cap assembly having means to electrically connect said sensor to said numeric indicator means.

14. The fitting, in accordance with claim 13, wherein the angle of inclination of said top surface of said cap is about 80° to 50°, preferably approximately 70°, relative to the main axis of the water mixer fitting when in its closed position.

15. A water mixer fitting, of the single-handle type, having hot and cold water inlets in fluid communication with a water discharge passage, said discharge passage including a mixing chamber in which mixed hot and cold water is discharged through a water outlet opening in said discharge passage, and valve means, operably coupled to said handle, for controlling water volume and for proportioning hot and cold water through said discharge passage, said mixer fitting comprising:
    a temperature sensor, operably coupled to said water discharge passage, and being in fluid communication therewith;
    an indicator means mounted on said handle and including a numeric temperature display electrically connected to a temperature measuring circuit and aid temperature sensor;
    said temperature measuring circuit including a battery as a first power source and at least one solar cell as a second power source, and having switching means for selectively operating said first and second power sources, said second power source being operable only above a given predetermined light intensity.

* * * * *